July 5, 1932.   O. UMBERTO   1,865,805
APPARATUS FOR LIFTING AND TURNING VEHICLES
Filed Jan. 29, 1931    2 Sheets-Sheet 1

Inventor
Onorati Umberto
By Owen & Owen
Attorneys

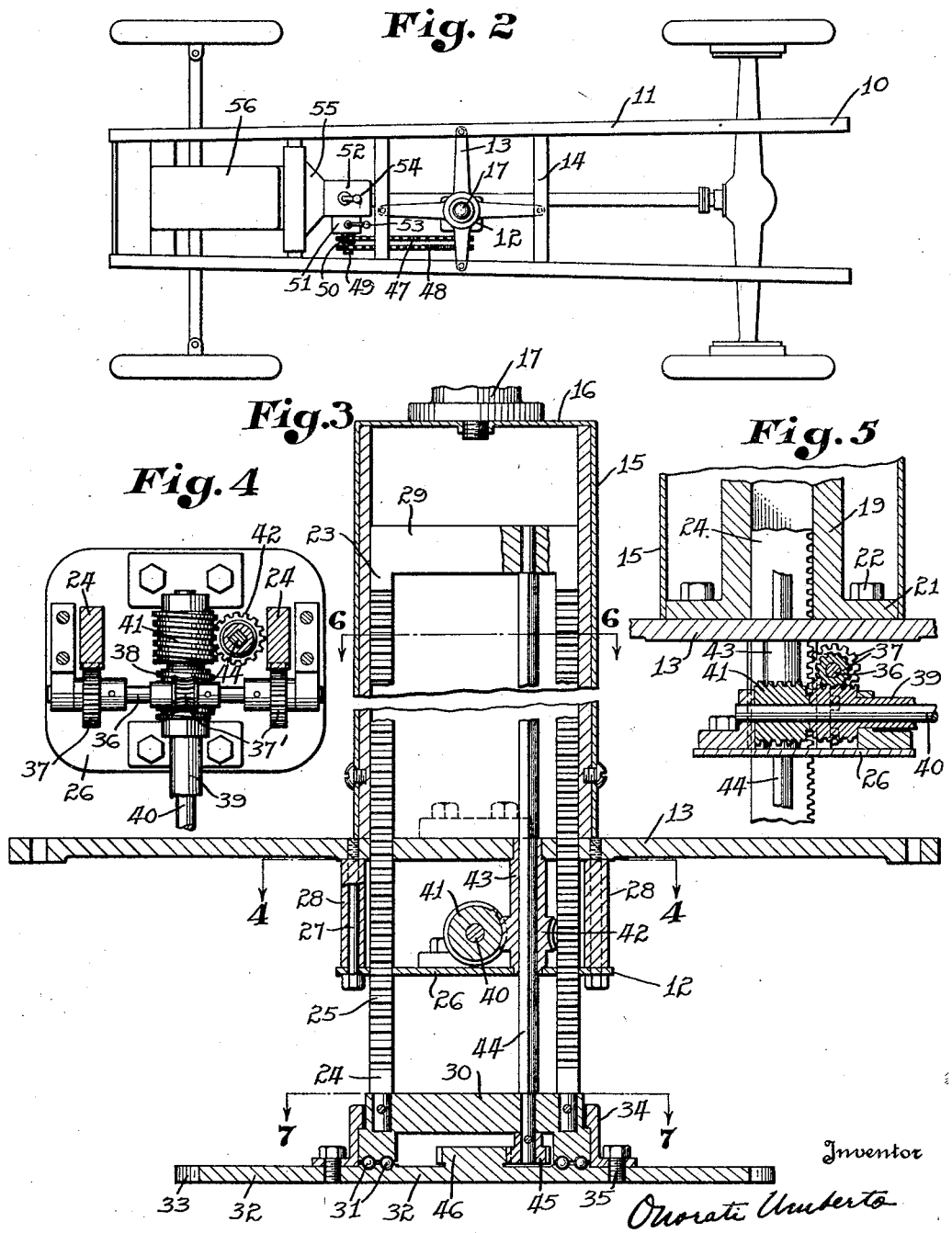

Patented July 5, 1932

1,865,805

UNITED STATES PATENT OFFICE

ONORATI UMBERTO, OF TOLEDO, OHIO

APPARATUS FOR LIFTING AND TURNING VEHICLES

Application filed January 29, 1931. Serial No. 512,069.

This invention relates to vehicle jacks and turntables, and an object is to produce a simple and efficient jack that can be carried on the underside of the vehicle, and when desired may be moved to engage the ground and elevate the vehicle clear of the ground, and after the vehicle is elevated to the desired height to turn or rotate the vehicle to the desired point.

A construction satisfying the above object is useful should, for example, an automobile become stuck in the mud, the mechanism may be conveniently operated to lift the vehicle from the mud. Another important use of the invention is for changing the tires, since all four wheels may be simultaneously lifted from the ground, thereby materially simplifying the troublesome task of changing tires. It is further apparent that the mechanism can be used to great advantage in making repairs to the underside of the automobile, it merely being necessary to actuate the mechanism for lifting the vehicle, which may be accomplished almost instantaneously, thereby making the underside of the vehicle readily accessible. A still further use of the invention may be had in garages where it is desired to store the machine and where it is desired to lift the tires from the ground. In accordance with the invention, the vehicle may be quickly lifted so that the machine can be stored with the tires clear of the ground.

In accordance with my invention, I provide a combined jack and turntable which has comparatively few parts. This enables the device to be easily constructed at a relatively low cost. The invention thus lends itself admirably to the manufacture of combined jacks and turntables on a production basis. The device can be readily embodied in automobiles already built, or may easily be made standard equipment on automobiles so that they can be so equipped during manufacture. An outstanding feature of the invention is that when not in use the device is out of sight, being concealed by the running board of the automobile so that the device cannot be seen by the casual observer. The operating mechanism is positioned adjacent the front seat so that the driver can readily control the operation without leaving his seat.

The invention is shown by way of illustration, but not of limitation, on the accompanying drawings, in which:

Fig. 2 is a top plan view of the chassis of an automobile showing the combined jack and turntable mounted thereon, and particularly illustrating the driving connection therefor;

Fig. 3 is an enlarged vertical sectional elevation of the device removed from the vehicle;

Fig. 4 is a transverse sectional elevation on the line 4—4 of Fig. 3 showing the gear arrangement for the jack and turntable;

Fig. 5 is a vertical sectional elevation showing details of the driving mechanism;

Figure 1:
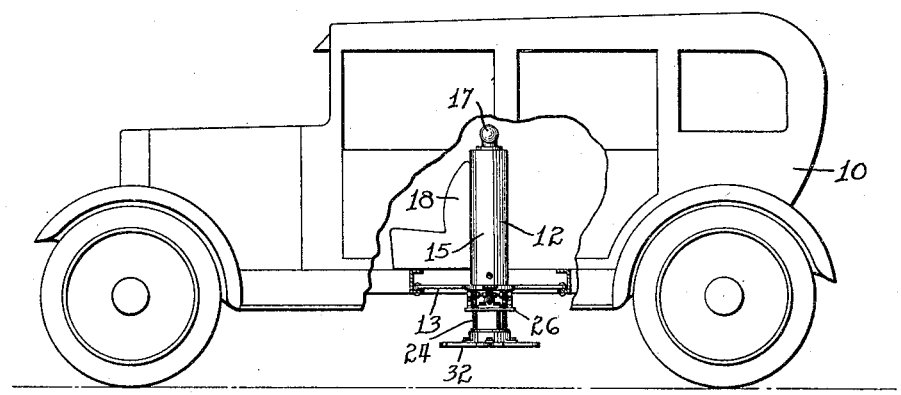
Fig. 1 is a side elevation of an automobile, a part of which is broken away to show my improved jack and turntable.
Figure 7:
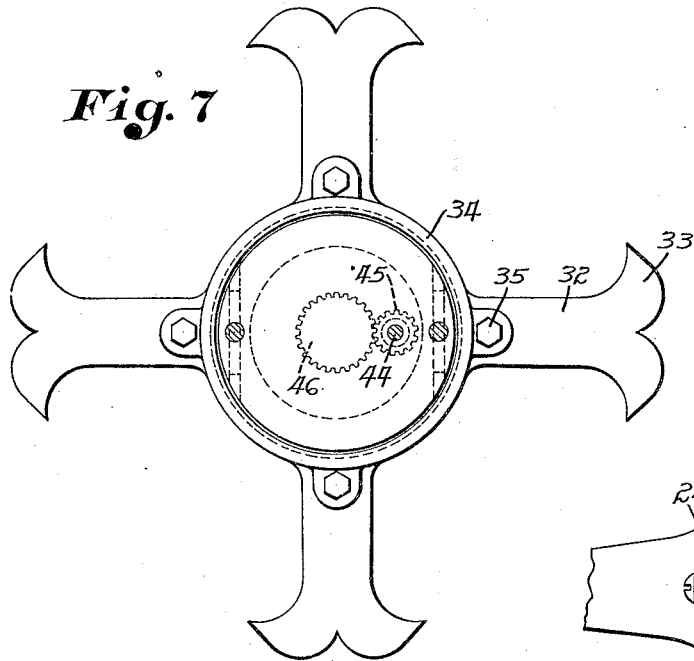
Fig. 7 is a transverse sectional view on the line 7—7 of Fig. 3.
Figure 6:
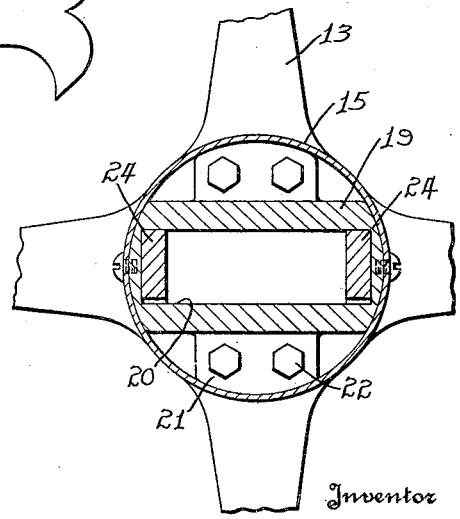
Fig. 6 is a transverse sectional view on the line 6—6 of Fig. 3.

Referring to the drawings, an automobile 10 having a chassis frame 11 is equipped with my combined jack and turntable generally designated by the numeral 12. The device comprises a mounting having four arms 13 arranged at right angles to each other, which are suitably secured to the side bar members of the chassis frame 11 and cross-bars 14 connecting the side bars. Rising from the central portion of the mounting is a tubular casing 15 having a closed upper end 16. A suitable emblem 17 may be connected to the top of the casing 15 for ornamental purposes, and, preferably, the upright casing 15 is disposed in the region of the front seat 18 of the automobile. It may be concealed by upholstering, or may be disposed directly in rear of the front seat. The emblem 17 may be employed to identify the vehicle as being equipped with my combined jack and turntable. As shown in Fig. 6, a frame 19 is disposed within the casing 15, and is provided with a rectangular guideway 20. The frame 19 is provided with flanges 21 on opposite sides which are connected to the mounting 13 by stud bolts 22.

Movable vertically in the guideway 20 is an actuating frame 23 having spaced parallel side members 24, each formed with a rack 25. The length of the actuating frame 23 is substantially the same as the length of the frame 19, plus a platform 26, which depends from the mounting 13, being connected thereto by bolts 27 and sleeves 28. The opposite ends of the actuating frame 23 are closed by heads 29 and 30, and the lower head 30 is rotatable on two sets of ball bearings 31 interposed between the head 30 and a foot member 32. The foot member 32 comprises four arms which are disposed at substantially right angles relatively to each other, the arms terminating in wing shaped end portions 33. The head 30 is held in the desired relation to the foot member 32 by a retainer band 34, which is fixed to the foot member by stud bolts 35.

Journaled on the platform 26 is a transverse shaft 36 carrying spaced pinions 37 meshing with the rack 25 on the side members 24. It will be seen that by rotating the shaft 36 in one direction the foot member 32 is lowered from the vehicle, but when rotated in the opposite direction the member is lifted from the ground. Also fixed on the shaft 36 is a worm wheel 37' meshing with a worm 38 fixed to a tubular shaft 39. Telescoping with the shaft 39 is a shaft 40 which carries a worm 41 with which meshes a vertically disposed worm wheel 42. The worm 42 has axial extensions 43 on opposite sides bearing respectively on the platform 26 and mounting 13 so as to prevent axial movement thereof.

Slidably mounted in the worm 42 and its extensions is a vertically disposed shaft 44 of non-circular cross-section, the worm 42 and extensions 43 being correspondingly shaped. Opposite end portions of the shaft 44 have bearing in the heads 29 and 30. It will be seen that the actuating frame 23 may be moved vertically in either direction, the shaft 44 sliding relatively to the worm 42. Mounted on the lower end of the shaft 44 is a gear 45 meshing with a gear 46, which in this instance is integral with the foot member 32.

From the above description it is apparent that rotation of the shaft 39 in one direction imparts downward movement of the foot member 32 through the above described connections. After the vehicle is raised to the desired extent the shaft 40 may be actuated to impart rotative movement to the vehicle. The vehicle may be lowered by rotating the shaft 39 in the opposite direction.

Figure 8:
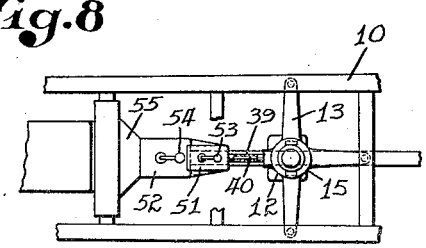
Fig. 8 is a plan view of a different manner of connecting the operating shafts to the auxiliary transmission.

The shafts 39 and 40 have chain and sprocket connections 47 and 48 respectively to telescoping shafts 49 and 50, which are operated from a transmission 51 adjacent the main transmission 52 of the automobile. As shown in Fig. 8, the telescoping shafts 39 and 40 may extend directly to the transmission 51 instead of employing the sprocket and chain connection. This is simpler and is desirable for reducing the cost of construction. A lever 53 is provided for the transmission 51, and the usual lever 54 is provided for the transmission 52. 55 represents the usual clutch interposed between the motor 56 and transmission 52.

In operation the lever 54 is placed in neutral so as to avoid drive of the rear wheels of the vehicle and the lever 53 is thrown to such position that the shaft 39 is actuated to move the foot member 32 downwardly, thereby to elevate the vehicle. After the vehicle is sufficiently elevated the lever 53 is moved to such position that the shaft 40 is actuated through its sprocket and chain connection for turning the vehicle to the desired point. When it is desired to lower the vehicle the lever 53 may be moved to render operative the mechanism for rotating the shaft 39 in the opposite direction. Detailed description of the transmission 51 is considered unnecessary since this may be constructed in any desired manner well known to those skilled in this art for actuating the sprocket and chain connections 47 and 48 in the manner above described.

It is to be noted that an important feature of the invention resides in concealing the jack when in elevated position, the parts being drawn upwardly so as to be hidden by the running board and adjacent body parts. If desired, clamps may be employed for holding the foot member 32 in raised position and prevent rattling of the parts. This is not shown on the drawings, but will be understood to be of any suitable type that will retain the foot members in raised position against rattling.

Numerous changes in details of construction, arrangement and operation may be effected without departing from the spirit of the invention, especially as defined in the appended claims.

What I claim as new and desire to secure by Letters Patent is:

1. In a device of the class described, the combination of a vehicle frame, a mounting secured to said frame, a platform depending from said mounting, an elongate casing rising from said mounting, an actuating frame movable in said casing, racks on said frame, pinions on said platform meshing with said racks, a shaft connecting said pinions, a worm wheel on said shaft, a worm for driving said wheel, a shaft for said worm, a head on the lower end of said actuating frame, a foot, anti-friction bearings between said foot and actuating frame, a retainer for holding said foot and actuating frame together, a gear fixed to said foot, a vertically disposed shaft within said actuating frame, a gear on the end of said shaft meshing with said gear on said foot, said shaft having a squared portion, a worm wheel on said shaft, means holding said worm wheel against longitudinal movement, a worm journaled on said platform for driving said worm wheel, a tubular shaft for said last worm fitting said first mentioned worm shaft, and means for driving said worm shafts.

2. In a device of the class described, the combination of a vehicle frame, a mounting secured to said frame, a platform depending from said mounting, an elongate casing rising from said mounting, an actuating frame movable in said casing, racks on said frame, pinions on said platform meshing with said racks, a shaft connecting said pinions, a worm wheel on said shaft, a worm for driving said wheel, a shaft for said worm, a head on the lower end of said actuating frame, a foot, anti-friction bearings between said foot and actuating frame, a retainer for holding said foot and actuating frame together, a gear fixed to said foot, a vertically disposed shaft within said actuating frame, a gear on the end of said shaft meshing with said gear on said foot, said shaft having a squared portion, a worm wheel on said shaft, means holding said worm wheel against longitudinal movement, a worm journaled on said platform for driving said worm wheel, a shaft for said last worm, and means for driving said worm shafts.

In testimony whereof I have hereunto signed my name to this specification.

ONORATI UMBERTO.